United States Patent [19]

Corley

[11] Patent Number: 4,831,099

[45] Date of Patent: May 16, 1989

[54] CURE RATE CONTROL IN EPOXY RESIN COMPOSITIONS

[75] Inventor: Larry S. Corley, Houston, Tex.

[73] Assignee: Shell Oil Company, Houston, Tex.

[21] Appl. No.: 48,512

[22] Filed: Apr. 14, 1987

Related U.S. Application Data

[63] Continuation of Ser. No. 818,511, Jan. 13, 1986, abandoned.

[51] Int. Cl.⁴ ...................... C08G 59/72; C08G 59/62
[52] U.S. Cl. ...................................................... 528/91
[58] Field of Search ........................................ 528/91

[56] References Cited

U.S. PATENT DOCUMENTS

| | | | |
|---|---|---|---|
| 2,824,083 | 2/1958 | Parry et al. | 528/91 |
| 3,080,341 | 3/1963 | Chenicek et al. | 528/91 |
| 3,281,491 | 10/1966 | Smith et al. | 528/91 |
| 4,092,296 | 5/1978 | Skiff | 528/91 |
| 4,415,682 | 11/1983 | Becker | 523/403 |
| 4,569,956 | 2/1986 | Breitigam et al. | 528/91 |

*Primary Examiner*—Veronica P. Hoke

[57] ABSTRACT

A composition is provided comprising an epoxy resin, a cationic curing agent for the epoxy resin and a polyalkylene glycol present in the composition in an amount effective to increase the cure rate reproducibility of the curing agent.

12 Claims, No Drawings

CURE RATE CONTROL IN EPOXY RESIN COMPOSITIONS

This is a continuation of application Ser. No. 818,511, filed Jan. 13, 1986, now abandoned.

BACKGROUND OF THE INVENTION

This invention relates to epoxy resin compositions. In one aspect, the invention relates to the curing of epoxy resin compositions. In a specific aspect, the invention relates to control of the cure rate of an epoxy resin composition containing a cationic curing agent.

Cationic curing agents for epoxy resins, such as Lewis acids ($BF_3$ and $SnCl_4$, for example) and their complexes, protonic acids containing anions of low nucleophilicity ($HBF_4$, $HPF_6$, $HSbF_6$, $CF_3SO_3H$ and $H_2SO_4$, for example) and certain salts of these acids have a number of useful properties. Many of these curing agents will cure liquid epoxy resins to hard solids without application of external heat within seconds or minutes after the resin and curing agent are mixed at room temperature.

Many of the best rapid cationic curing agents for epoxy resins, such as $HBF_4$, $HPF_6$ and a number of tetrafluoroborate salts, are available commercially only as aqueous solutions. These aqueous solutions are not soluble in bisphenol A-based epoxy resins and form suspensions of small globules when mixed with the resins. Cure of the resins is dependent on diffusion of the cationic initiator from the globules of aqueous solution into the bulk of the resin phase. The rate of cure will therefore be strongly dependent on the size and degree of dispersion of the globules of aqueous curing agent solution and hence on mixing intensity. In some cases, rapid cure can occur at the interface around a particle of aqueous curing agent solution. This will retard or prevent diffusion of the curing agent into the bulk of the resin, resulting in delayed or incomplete cure.

The problem can be solved for certain cationic curing agents by dissolving the curing agent in an organic solvent instead of water. The solution of cationic curing agent is soluble in the epoxy resin, and mixing of the resin and curing agent is easier. Some cationic curing agents, however, are not very soluble in organic solvents. Others, such as $HBF_4$, are unstable in some organic solvents, tending to revert to gaseous HF and $BF_3$. Even where these factors are not a problem, however, the evaporation of water from a cationic curing agent solution and its replacement by an organic solvent require considerable energy expenditure.

The use of aqueous solutions of cationic curing agents can have the further disadvantage, in addition to low solubility in epoxy resins, of strong acidity and corrosivity to skin and eyes. Use of low-viscosity solutions thus involves splash hazards during pouring and increases the hazards to personnel involved in the use of cationic curing agents for curing epoxy resins.

It would be desirable to provide a method for improving the cure rate reproducibility of epoxy resin systems containing aqueous cationic curing agents.

It is therefore an object of the present invention to provide novel epoxy resin compositions containing cationic curing agents. It is a further object to improve the cure rate reproducibility of epoxy resin systems containing aqueous solutions of cationic curing agents. It is a further object to decrease the splash hazards of handling solutions of acidic cationic curing agents.

SUMMARY OF THE INVENTION

According to the invention, the cure rate reproducibility of epoxy resin compositions containing cationic curing agents is improved by carrying out the curing reaction in the presence of a non-surfactant polyalkylene glycol. The invention is particularly applicable to cationic curing agents in aqueous solution because of the problems of handlign acidic solutions, which are reduced by use of the invention.

DETAILED DESCRIPTION OF THE INVENTION

The epoxy resin component of the invention compositions can be any curable epoxy resin having, on the average, more than one vicinal epoxide group per molecule. The epoxy resin can be saturated or unsaturated, aliphatic, cycloaliphatic, aromatic or heterocyclic, and may bear substituents which do not materially interfere with the curing reaction. They may be monomeric or polymeric.

Suitable epoxy resins include glycidyl ethers prepared by the reaction of epichlorohydrin with a compound containing at least one hydroxyl group carried out under alkaline reaction conditions. The epoxy resin products obtained when the hydroxyl group-containing compound is bisphenol-A are represented below by structure I wherein n is zero or a number greater than 0, commonly in the range of 0 to 10, preferably in the range of 0 to 2.

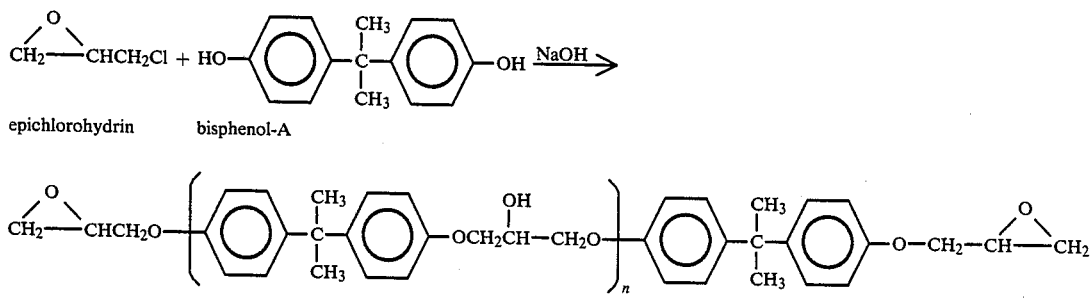

I

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of 50 to about 10,000, preferably about 200 to about 1500. The commercially available epoxy resin EPON 828, a reaction product of epichlorohydrin and 2,2-bis(4-hydroxyphenyl) propane (bisphenol-A) having a molecular weight of about 400, an epoxide equivalent (ASTM D-1652) of about 185-192, and an n value in formula I above of about 0.2, is presently the preferred epoxy resin because of its wide applicability and commercial availability.

The epoxy resin will be used in combination with a curing agent. Many varieties of curing agents for epoxy resins are known in the art, including amines, acids and anhydrides. The invention method of controlling the cure rate of an epoxy resin composition containing a curing agent is particularly suitable for use with cationic curing agents. As is known in the art, "cationic curing agents" include Lewis acids and their complexes, protonic acids containing anions of low nucelophilicity and salts of such protonic acids. Specific examples of such cationic curing agents include, for example, $BF_3$, $SnCl_4$, $HBF_4$, $HPF_6$, $HSbF_6$, $CF_3SO_3H$, $H_2SO_4$, $BF_3 \cdot (C_2H_5)_2O$, and certain metal tetrafluoroborates such as $Sn(BF_4)_2$, $Mg(BF_4)_2$ and $Al(BF_4)_3$. Such curing agents will generally cure liquid epoxy resins at room temperature to hard solids within a few seconds or minutes after epoxy resin and curing agent are mixed. The cationic curing agents will often be available as an aqueous solution. The use of a polyalkylene glycol in combination with the cationic curing agent permits the use of such aqueous solutions without the attendant splash hazards and poor cure rate reproducibility. It is thus possible to obtain good cure rate reproducibility with the cationic curing agents in the absence of an organic solvent.

The curing agent will be added to an epoxy resin in an amount which will effect cure of the resin to a solid under suitable curing conditions, which may include the application of heat to the epoxy resin. The curing agent will generally be present in an amount of about 0.01 to about 10 weight percent, based upon the weight of the epoxy resin, preferably about 0.5 to about 5 weight percent.

The invention composition further contains a non-surfactant polyalkylene glycol in an amount effective to improve the cure rate consistency of the epoxy/curing agent composition. As used herein, the term "surfactant" refers to molecules containing both a hydrophobic group of 10 or more carbon atoms and a hydrophilic group. Suitable polyalkylene glycols include polytetrahydrofuran, polyethylene glycol, polypropylene glycol and random copolymeric polyethylene/propylene glycol. The molecular weight of such polyalkylene glycols can vary from about 200 to about 50,000 and will generally be about 1000 to about 30,000. Preferred polyalkylene glycols have a molecular weight of from about 10,000 to about 30,000, as these permit preparation of an aqueous curing system which has a viscosity approximately the same as that of the epoxy resin with which it will be used. This in turn has the advantages of reducing splashing of the corrosive curing agent during handling and permitting easier mixing of the epoxy and curing agent. The preferred polyalkylene glycols are polyethylene glycol and polyethylene glycol containing a small amount, generally up to about 40 percent, of randomly polymerized propylene oxide.

The polyalkylene glycol is present in the composition in an amount effective to improve the reproducibility of the cure rate of the epoxy resin, and will generally be present in an amount of from about 10 to about 500 weight percent, generally about 50 to about 300 weight percent, and preferably about 75 to about 200 weight percent, based on the weight of the curing agent.

The invention composition can optionally contain additives for control of the curing rate, such as accelerators or retardants of the cure reaction. The invention method of improving the reproducibility of cure rates with cationic curing agents can be practiced with compositions containing such optional additives.

Mixing of the epoxy resin and curing agent is preferably carried out by combining, with vigorous stirring, the epoxy resin with an aqueous solution of the curing agent and polyalkylene glycol.

The invention compositions are useful generally in typical epoxy resin applications such as coatings, structural composites and particularly adhesives.

EXAMPLE 1

Twelve 100 mL polypropylene beakers were each filled with 25 grams of a mixture of 100 parts of EPON ® Resin 828 and 4 parts of Naugalube 438-L. (Naugalube 438-L is a mixture of alkylated diphenylamines sold by Uniroyal. It is added to the resin to control the rate of gelation.) To the first group of 6 beakers was added 0.67g of 48% aqueous tetrafluoroboric acid. To the second group of 6 beakers was added a mixture of 0.6g of 48% aqueous tetrafluoroboric acid and 0.6g of Union Carbide Polyethylene Glycol Compound 20M. (This mixture had a 22° C. Brookfield viscosity of 5.68 Pa's.) The mixtures of resin and curing agent were hand stirred rapidly with wooden tongue depressors and time to gelation was determined. Results are given in the table below.

| Curing Agent | Time to Gelation (Seconds) | Mean | Standard Deviation |
| --- | --- | --- | --- |
| 48% Aqueous $HBF_4$ | 250, 146, 150, 65, 42, 280 | 155.5 | 95.5 (61.4% of Mean) |
| 48% Aqueous $HBF_4$ Plus Polyethylene Glycol Compound 20 M | 86, 85, 85, 84, 82, 83 | 84.2 | 1.5 (1.7% of Mean) |

The above table shows that the Polyethylene Glycol Compound 20M decreases mean time to gelation by approximately a factor of two and also greatly improves reproducibility.

EXAMPLE 2

Four 100 mL polypropylene beakers were each filled with 25 grams of a mixture of 80 parts of EPON$^R$ Resin 834, 20 parts of Azepoxy 8 (glycidyl ether of a mixture of $C_{11}$-$C_{13}$ normal primary saturated alcohols) and 3.68 parts of Naugalube 438-L. To each of the first group of two beakers was added 0.75 g of a mixture of equal parts of 48% aqueous $HBF_4$ and Union Carbide Polyethylene Glycol Compound 20M. To each of the second group of two beakers was added 2.5 g of a mixture of 15 parts by weight of 48% aqueous $HBF_4$ and 85 parts by weight of Union Carbide UCON Lubricant 75-H-90000 (a random copolymer of ethylene oxide and propylene oxide). (One may notice that equal amounts of HBF$_4$ were introduced into each beaker.) The mixtures of resin and curing agent were hand stirred rapidly with wooden tongue depressors onto which were stapled twisted thermocouple wires. The time to gelation, maximum temperature attained, and time to maximum temperature were recorded. A thin film of each mixture was also spread out onto the lid of a paint can held at room temperature and the time required for this thin film to gel was recorded.

| Curing Agent | Gel Time, 25 g mass, Seconds | Maximum Temperature Recorded, °C. | Time to Maximum Temperature, Seconds | Thin Film Gel Time, 25° C. Seconds |
|---|---|---|---|---|
| 48% Aqueous HBF$_4$ Plus Polyethylene Glycol Compound 20 M | 152, 150 | 162, 158 | 175, 180 | 325, 400 |
| 48% Aqueous HBF$_4$ Plus UCON Lubricant 75-H-90000 | 260, 275 | 130, 144 | 275, 385 | 1300, 1250 |

The above table shows than random copolymers of ethylene oxide and propylene oxide can be mixed with aqueous HBF$_4$ to prepare viscous liquid curing agents which can be used similarly to those prepared with ethylene oxide homopolymers. The random copolymers have an advantage in that they form liquid mixtures in all proportions with 48% aqueous HBF$_4$, while the higher molecular weight ethylene oxide homopolymers tend to crystallize out of solution when present in concentrations higher than 50%. The solutions with higher concentrations of polymer contain lower concentrations of HBF$_4$ and hence are expected to be less hazardous on skin contact.

I claim:
1. A composition comprising:
   (a) an epoxy resin;
   (b) a cationic curing agent for the epoxy resin; and
   (c) a non-surfactant polyalkylene glycol having a molecular weight within the range of from about 10,000 to about 30,000 and present in the composition in an amount effective to increase the cure rate reproducibility of the cationic curing agent.
2. The composition of claim 1 in which the cationic curing agent is selected from the group consisting of Lewis acids, complexes of Lewis acids, protonic acids having anions of low nucleophilicity, and metal salts of said protonic acids.
3. The composition of claim 2 in which the polyalkylene glycol is selected from the group consisting of polyethylene glycol, polypropylene glycol, polethylene/propylene glycol and polytetrahydrofuran.
4. The composition of claim 3 in which the polyalkylene glycol is present in the composition in an amount of from about 10 to about 500 weight percent, based on the weight of the curing agent.
5. The composition of claim 1 in which the cationic curing agent is an aqeuous solution selected from the group consisting of aqueous solutions of BF$_3$, SnCl$_4$, HBF$_4$, HPF$_6$, HSbF$_6$, CF$_3$SO$_3$H, H$_2$SO$_4$, Sn(BF$_4$)$_2$, Al(BF and Mg(BF$_4$)$_2$.
6. The composition of claim 5 in which the polyalkylene glycol is present in the composition in an amount of from about 50 to about 300 weight percent, based on the weight of the curing agent.
7. The composition of claim 6 in which the curing agent is present in an amount of from about 0.01 to about 10 weight percent, based on the weight of the epoxy resin.
8. The composition of claim 7 in which the polyalkylene glycol is polyethylene glycol having a molecular weight of from about 10,000 to about 30,000.
9. A method for improving the cure rate reproducibility of an epoxy resin composition comprising an epoxy resin and a cationic curing agent, the method comprising incorporating in the epoxy resin composition an effective amount of a non-surfactant polyethylene glycol having a molecular weight within the range of from about 10,000 to about 30,000.
10. The method of claim 9 in which the cationic curing agent is an aqueous solution of a compound selected from the group consisting of BF$_3$, SnCl$_4$, HBF$_4$, HPF$_6$, HSbF$_6$, CF$_3$SO$_3$H, H$_2$SO$_4$, Sn(BF$_4$)$_2$, Al(BF$_4$)$_3$Mg(BF$_4$)$_2$.
11. The method of claim 9 in which the polyalkylene glycol is selected from the group consisting of polyethylene glycol, polypropylene glycol, polyethylene/propylene glycol and polytetrahydrofuran.
12. The method of claim 11 in which the polyalkylene glycol is present in an amount of from about 10 to about 500 weight percent, based on the weight of the curing agent.

* * * * *